United States Patent [19]
Sekiguchi

[11] 4,084,179
[45] Apr. 11, 1978

[54] COLOR TELEVISION CAMERA
[75] Inventor: Takeshi Sekiguchi, Tokyo, Japan
[73] Assignee: Canon Kabushiki Kaisha, Tokyo, Japan
[21] Appl. No.: 727,752
[22] Filed: Sep. 29, 1976
[30] Foreign Application Priority Data
Oct. 7, 1975   Japan ............................. 50-121087
[51] Int. Cl.² ........................................... H04N 9/04
[52] U.S. Cl. ................................................. 358/55
[58] Field of Search ......................................... 358/55
[56] References Cited
U.S. PATENT DOCUMENTS
3,563,635   2/1971   DeLang .................... 358/55 X
3,610,818   10/1971  Bachmann ..................... 358/55

*Primary Examiner*—Robert L. Richardson
*Attorney, Agent, or Firm*—Fitzpatrick, Cella, Harper & Scinto

[57] ABSTRACT

In a color television camera of a construction wherein a light beam is separated into a plurality of beams of necessary wavelength ranges by a color separating optical system and these beams are caused to impinge on the light receiving surfaces of respective pick-up tubes, color filter means is provided in the path followed by the light beam before entering any of the color separation surfaces of the color separating optical system, which filter means continuously varies its transmission factor for the light of a preselected one of the plurality of necessary wavelength ranges from one end thereof to the other, whereby the color shading which would otherwise take place on the image display surface of a television receiver may be optically prevented.

15 Claims, 32 Drawing Figures

COLOR TELEVISION CAMERA

BACKGROUND OF THE INVENTION

1. Field of the Invention

This invention relates to a color television camera, and more particularly to a color television camera which may prevent occurrence of color shading.

2. Description of the Prior Art

Generally in a color television camera, a color separating optical system is disposed in the light path of an objective lens so that the light beam from an object may be separated into beams of red, green and blue wavelength ranges by the color separating optical system and these three beams may impinge on image pick-up devices for respective color channels so as to form red, green and blue images of the object on the respective light receiving surfaces which are photosensitive. The color separating optical system usually employed has comprised a prism or a glass plate having evaporated thereon a so-called dichroic layer which is capable of reflecting almost all of the light of a particular wavelength range and transmitting almost all of the light of the other wavelength ranges. In order that the light beam from the object may be separated into light beams of three colors as described above, it is only required, for example, that a dichroic layer capable of reflecting the blue light and transmitting the lights of the other wavelength ranges and a dichroic layer capable of reflecting the red light and the lights of the other wavelength ranges be successively disposed in an inclined relationship with the optical axis of the objective lens.

The wavelength selecting characteristic of the dichroic layer depends on the angle of incidence of light. More specifically, as the angle of incidence of light is varied, the spectral distribution of the reflected light, hence that of the transmitted light is varied. Therefore, unless the camera is specially designed, the phenomenon known as color shading will occur on the image display surface of the television receiver. For convenience of description, this will now be discussed with reference to the conventional color television camera as shown in FIG. 1 of the accompanying drawings. In FIG. 1, an objective lens 1 is disposed in opposed relationship with an object O which is to be displayed as an image for viewing on the image display surface of a television receiver. Designated by 2 is an exit pupil of the objective lens. First second dichroic mirrors 3, 4 have color separating surfaces 3' and 4' (hereinafter referred to as the first and second color separating surfaces) are coated respectively with a dichroic layer capable of reflecting light of the blue wavelength range and transmitting lights of the other wavelength ranges, and a dichroic layer capable of reflecting light of the red wavelength range and transmitting lights of the other wavelength ranges. As shown, the first and second dichroic mirrors 3 and 4 are disposed in the backfocus space of the objective lens 1 in an inclined relationship with respect to the optical axis A of the objective lens in such a manner that the reflecting axes $RA_3$ and $RA_4$ of the two dichroic mirrors lie in a common plane (plane of the drawing sheet) and at the opposite sides with respect to the optical axis A of the objective lens. Designated by $5_B$ is a blue channel image pick-up tube having a light receiving surface $5_B'$ disposed at such a position as to receive the blue light from the object reflected by the first dichroic mirror 3 via a mirror 7 for reducing the size of the camera by bending the light path, to form thereon the image of the object passed through the objective lens 1. Designated by $5_G$ and $5_R$ are green and red channel image pick-up tubes, respectively. The light receiving surface $5_G'$ of the red channel image pick-up tube is disposed at such a position as to receive the green light beam passed from the object through the second dichroic mirror 4 and to form thereon the image of the object passed through the objective lens 1. The light receiving surface $5_R'$ of the red channel image pick-up tube is disposed at such a position as to receive the red light beam from the object reflected by the second dichroic mirror 4 and to form thereon the image of the object passed through the objective lens 1. Thus, the blue, green and red images $6_B$, $6_G$ and $6_R$ of the object are formed on the light receiving surfaces $5_B'$, $5_G'$ and $5_R'$. The image pick-up tubes $5_B$, $5_G$ and $5_R$ respectively scan these images $6_B$, $6_G$ and $6_R$ to generate electrical signals corresponding to the respective images, namely, the distribution of light quantity on the light receiving surfaces. In the light path between the first dichroic mirror 3 and the light receiving surface $5_B'$, and in the light path between the second dichroic mirror 4 and the light receiving surfaces $5_G'$, $5_R'$, there are disposed trimming filters $8_B$, $8_G$ and $8_R$ having the characteristics to be described later, so as to regularize the spectral distribution on the respective light receiving surfaces.

Now, as shown, $B_c$, $G_c$ and $R_c$ define the center points in the light receiving surfaces $5_B'$, $5_G'$ and $5_R'$ of the image pick-up tubes, namely, the points, at which the center point $O_c$ of the object O is focused; $B_l$, $G_l$ and $R_l$ at the points, at which the points $O_l$ in the object O (in FIG. 1, the lower point of the object on the plane of the drawing sheet) is focused; and, $B_u$, $G_u$ and $R_u$ define the points whereat the point $O_u$ in the object (in FIG. 1, the upper point of the object on the plane of the drawing sheet) is focused. In FIG. 1, the principal ray in the light beam travelling from the objective lens 1 toward the center point $G_c$ and the opposite extremities $G_l$ and $G_u$ of the light receiving surface $5_G'$ for the green channel is represented by the lines connecting the center P of the exit pupil of the objective lens 1 to the points $G_c$, $G_u$ and $G_l$, namely, the lines $PG_c$, $PG_l$ and $PG_u$. Assuming that $\theta$ is an angle formed between the principal ray $PG_c$ and the principal respective rays $PG_l$ and $PG_u$, $\alpha$ is the angle of incidence of the principal ray $PG_c$ on the color separating surface 3' of the first dichroic mirror 3, and $\beta$ the angle of incidence of the principal ray $PG_c$ on the color separating surface 4' of the second dichroic mirror 4. The angles of incidence of the principal ray $PG_l$ on the first and second color separating surfaces 3' and 4' are $\alpha - \theta$ and $\beta + \theta$, respectively, and the angles of incidence of the principal ray $PG_u$ on the first and second color separating surfaces 3' and 4' are $\alpha + \theta$ and $\beta - \theta$, respectively. Apparently, these angles of incidence have the relationship $\alpha + \beta > \alpha > \alpha - \theta$ and $\beta + \theta > \beta > \beta - \theta$.

The first dichroic mirror 3 which reflects almost all of the light of the blue wavelength range depending on the magnitude of the angle of incidence and transmits almost all of the lights of the other wavelength ranges exhibits the characteristic as illustrated in FIG. 2A, and the second dichroic mirror 4 which reflects almost all of the light of the red wavelength range and transmits almost all of the lights of the other wavelength ranges exhibits the characteristic as illustrated in FIG. 2B. In FIGS. 2A and 2B, the ordinate and the abscissa, respectively, the transmission factor and the wavelength, and the broken line curve indicates the transmission factor for the ray travelling from the point P to the points $B_u$, $G_u$ and $R_u$, the solid line curve indicates the transmission factor for the ray travelling from the point P to the points $B_c$, $G_c$ and $R_c$, and the chain line curve indicates the transmission factor for the ray travelling from the point P to the points $B_l$, $G_l$ and $R_l$. On the other hand, the trimming filters $8_B$, $8_G$ and $8_R$ shown in FIG. 1 have the characteristics of transmitting the blue, green and red light, respectively, as illustrated in FIGS. 3A, 3B and 3C. Considering the spectral distributions on the light receiving surfaces of the blue, green and red channel image pick-up tubes, it is seen from FIGS. 2A and 2B and FIGS. 3A, 3B and 3C that the curves representing such distributions are as illustrated in FIGS. 4A, 4B and 4C.

FIGS. 4A, 4B and 4C, the ordinate represents the quantity of light which has reached the light receiving surface of each image pick-up tube, while the abscissa represents the wavelengths, and the broken line curve indicates the spectral distribution at the points $B_u$, $G_u$ and $R_u$, the solid line curve indicates the spectral distribution at the points $B_c$, $G_c$ and $R_c$, and the chain line curve indicates the spectral distribution at the points $B_l$, $G_l$ and $R_l$.

Considering the distribution of the relative light quantity of light on the light receiving surfaces $5_B'$, $5_G'$ and $5_R'$ of the respective channel image pick-up tubes, when they pick up an image emitting a uniform intensity of white light from the entire surface thereof, it is seen in FIGS. 4A, 4B and 4C that the curves representing such distribution have the tendencies as indicated by solid lines in FIGS. 5A, 5B and 5C, respectively. In each of these Figures, the ordinate represents the relative quantity of light and the abscissa represents the line passing from the point whereat the point $O_l$ on the object is focused on the light receiving surface of the pick-up tube to the point whereat the point $O_u$ on the object is focused. The term "relative quantity of light" herein used means the ratio of the quantity of light at a spatial point in the beam impinging on the light receiving surface of the pick-up tube to a referential quantity of light which is the light quality at any given spatial point in said beam when the pick-up tube picks up the image of an object emitting a uniform intensity of white light from the entire surface thereof.

It is apparent from FIGS. 5A, 5B and 5C that if the object to be photographed is a white one, when the electrical signals generated in accordance with the quantities of light from the white object reaching the center points $B_c$, $G_c$ and $R_c$ of the light receiving surfaces $5_B'$, $5_G'$ and $5_R'$ are so adjusted by known pick-up tube signal processing means that an exact white image is formed at the center of the television receiver, no white image will be formed on the opposite sides of the television receiver but colored images will appear there. This will be seen by comparing intensities of the signals obtained at the points $B_l$, $G_l$ and $R_l$ on the light receiving surfaces $5_B'$, $5_G'$ and $5_R'$ which correspond to the point $O_l$ on the object. As is clear from FIGS. 5A, 5B and 5C, the blue signal obtained at the point $B_l$ and the red signal obtained at the point $R_l$ are greater in intensity than the green signal obtained at the point $G_l$, on account of which the image corresponding to the $O_l$ side of the object is tinged in light purple on the television receiver. Likewise, the blue signal obtained at the point $B_u$ and the red signal obtained at the point $R_u$ are weaker in intensity than the green signal obtained at the point $G_u$, so that the image corresponding to the $O_u$ side of the object is tinged in light green on the television receiver. Such color irregularity on the television receiver is called the color shading. This color shading also occurs when the beam for focusing a reference pattern image on the light receiving surfaces of the respective image pick-up tubes without causing it to pass through an objective lens is color-separated to effect control of the light beam from a light source for bias illumination, the registration of the pick-up tube signal processing device, and the white balance. The color shading resulting from the bias light will hereinafter be described as an example.

As is well-known, there are pick-up tubes which, unless specially designed, cause an afterimage to be formed on the television receiver when an object is photographed under a low intensity of illumination. In order to suppress such afterimage phenomenon, it has usually been practised to illuminate the light receiving surface of the pick-up tube with a predetermined intensity of light at all times. This is called the bias illumination.

In the apparatus of FIG. 1, in order to bias-illuminate each channel image pick-up tube, a light beam for bias illumination is thrown upon the color separating surface 3' of the first dichroic mirror 3 in a direction symmetrical with the direction of incidence of the light beam from the object relative to the color separating surface 3'. Designated by 9 is the source lamp which emits white light containing lights of various wavelengths. The light emitted from the lamp 9 is diffused by a diffusing plate 10. Designated by 11 is a condenser lens disposed with the optical axis thereof intersects with the optical axis of the object lens 1. The optical axis of the condenser lens is integrated with the optical axis of the lens 1 by the first dichroic mirror 3 disposed at the intersection between the optical axes of the condenser lens 11 and the lens 1. The condenser lens 11 focuses the image of the diffusing plate 10 or of the space adjacent thereto on the light receiving surface of each pick-up tube. The light beam passed through the condenser lens 11 reaches the blue channel image pick-up tube $5_B$ through the first dichroic mirror, and also reaches the green and red channel pick-up tubes $5_G$ and $5_R$ through the first and the second dichroic mirrors 3 and 4, respectively. From the characteristics of the first and second dichroic mirrors 3 and 4 illustrated in FIGS. 2A and 2B, and from the characteristics of the trimming filters $8_B$, $8_G$ and $8_R$ illustrated in FIGS. 3A, 3B and 3C, the spectral distributions of the bias light on the light receiving surfaces $5_B'$, $5_G'$ and $5_R'$ of the blue, green and red channel image pick-up tubes are as shown in FIGS. 6A, 6B and 6C, respectively. In these Figures, the broken line curves indicate the spectral distribution at the points $B_u$, $G_u$ and $R_u$ on the light receiving surfaces, the solid line curves indicate the spectral distribution at the points $B_c$, $G_c$ and $R_c$, and the chain line curves indicate the spectral distribution at the points $B_l$, $G_l$ and $R_l$. (It should be noted here that the first dichroic mirror 3, for example, does not transmit therethrough 100% of the light of the red and green wavelength ranges but reflects extremely small part of such lights. Thus, the light beam from the bias light source reflected by the first dichroic mirror 3 and directed to the second dichroic mirror 4 contains therein the lights of the red and green wavelength ranges, although the light of the blue range occupies the major proportion in this light beam.) It is seen from FIGS. 6A, 6B and 6C that the relative quantity of the bias light on the light receiving surfaces $5_B'$, $5_G'$ and $5_R'$ of the blue, green and red channel pick-up tubes exhibits the tendencies as indicated by the solid lines in FIGS. 7A, 7B and 7C. As already described in connection with FIGS. 5A, 5B and 5C, the distribution of the quantity of the bias light on the blue channel light receiving surface $5_B'$ differs in tendency from that on the green or the red channel light receiving surface $5_G'$, $5_R'$. Therefore, if each channel pick-up tube is bias-illuminated by the arrangement as shown in FIG. 1, there will still occur the color shading. As also described previously, in order to project and focus a reference pattern image on the light receiving surface of each image pick-up tube, the diffusing plate 10 in FIG. 1 may be used as the reference pattern and the lens 11 as the projecting lens. Again in this case, the color shading will likewise occur.

In the past, the above-described color shading was eliminated by electrically correcting the signal or signals generated by one or two of the blue, green and red channel image pick-up tubes. For example, in the apparatus of FIG. 1, the elimination of the color shading resulting from the light beam from the object is accomplished by correcting the electrical signal generated by the green channel image pick-up tube $5_G$ so that the level of the signal obtained at the $G_u$ side of the light receiving surface $5_G'$ is lower than the level of the signal obtained at the $G_l$ side. By doing so, the distribution of the relative quantity of light of the light beam which is incident on the light receiving surface $5_G'$ is similar to that indicated by the broken line in FIG. 5B and thus, the color shading may be eliminated.

The foregoing method, in which an electrical correction is made to the signal from the pick-up tube, is disadvantageous in that it leads to a complicated construction of the signal processing circuit. Further, the signal(s) to be corrected is in advance level-corrected at a predetermined proportion corresponding to each point on the light-receiving surface and therefore, as the absolute quantity of light incident on the light receiving surface varies, there occurs a great variation in the difference between the absolute value of the gradient of the level of the corrected signal with respect to the transverse direction of the light receiving surface and the absolute value of the gradient of the level of the uncorrected signal with respect to the transverse direction of the light receiving surface. Thus, if the quantities of light incident on the image pick-up tubes are fluctuated, the colors on the display surface of the television receiver will also be varied so that it will be impossible to sufficiently eliminate the color shading merely by electrically correcting the signal(s) from the image pick-up tube(s). Further, in the image pick-up device contained within the bias illumination system or within the reference pattern projecting system as shown in FIG. 1, that the tendency of distribution of relative quantities of light on the light receiving surfaces $5_B'$ and $5_G'$ of the blue and green channel image pick-up tubes differs from the tendency of distribution in the relative light quantity with respect to the bias-illuminating light, as is apparent from FIGS. 5A and 5B and FIGS. 7A and 7B. In such a case, it is extremely difficult to eliminate the color shading by electrically correcting the signals from the image pick-up tubes.

SUMMARY OF THE INVENTION

It is a primary object of the present invention to provide a color television camera which can simply prevent the occurrence of color shading.

It is another object of the present invention to provide a color television camera which can prevent the occurrence of color shading without electrically correcting the electrical signals from image pick-up devices.

It is still another object of the present invention to provide a color television camera which contains therein a bias illuminating optical system and/or a pattern projecting optical system and yet can prevent the occurrence of color shading.

It is yet another object of the present invention to provide a color television camera which can prevent the occurrence of color shading by correcting the light beam incident on the image pick-up device.

To achieve these objects, the color television camera according to the present invention comprises a plurality of image pick-up devices each having a light receiving surface for receiving a light beam of a predetermined wavelength range and generating an electrical signal corresponding to the distribution of the quantity of light regarding the light beam of the predetermined wavelength range impinging on the light receiving surface, a lens system optically opposed to an object and each of the plurality of image pick-up devices, a color separating optical system having at least one dichroic surface disposed in the light path between the plurality of image pick-up devices and in oblique relationship with the optical axis of the lens system, the dichroic surface being effective to separate the light beam from the object passed through the lens system into a plurality of light beams of predetermined wavelength ranges which are to impinge on the light receiving surface of the plurality of image pick-up devices, and a color filter whose transmission factor for the light of at least one wavelength range selected from the plurality of wavelength ranges continuously varies from one end thereof to the other, the color filter being disposed in the light path between the lens system and the dichroic surface of the color separating optical system so that the direction in which its transmission factor for the light of the selected wavelength range varies may correspond to the direction in which the relative quantity of light regarding the light beam of the selected predetermined wavelength range varies.

The above objects and other features of the present invention will become fully apparent from the following detailed description of the invention taken in conjunction with the accompanying drawings.

DESCRIPTION OF THE PREFERRED EMBODIMENTS

Figure 1:
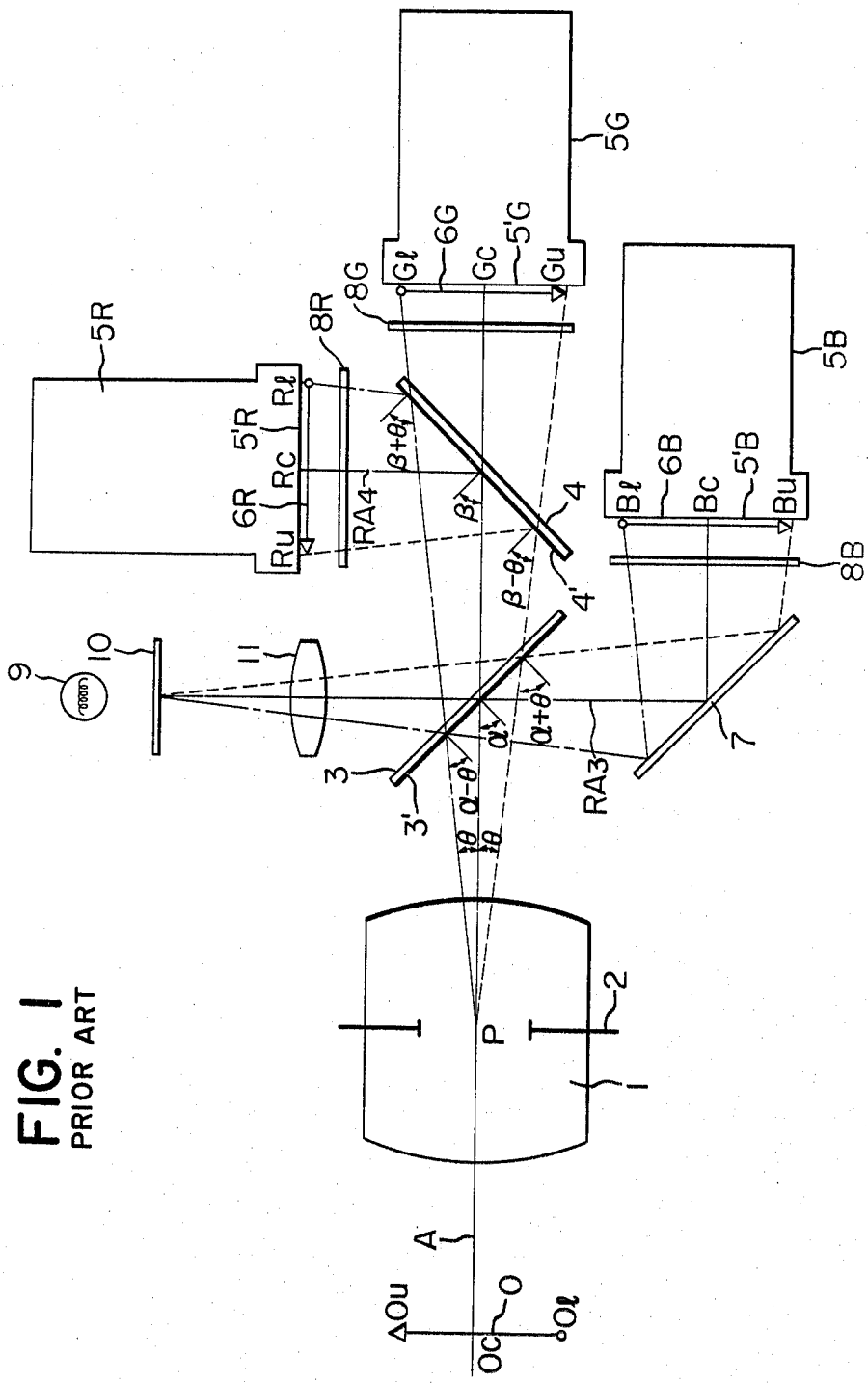
FIG. 1 is a schematic illustration of the optical system in conventional color television camera.
Figure 2A:
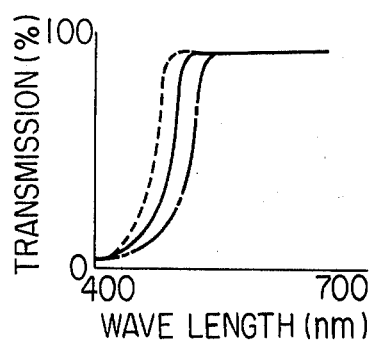
FIGS. 2A and 2B are graphs illustrating the light transmitting characteristics of the first and the second color separating surface.
Figure 2B:
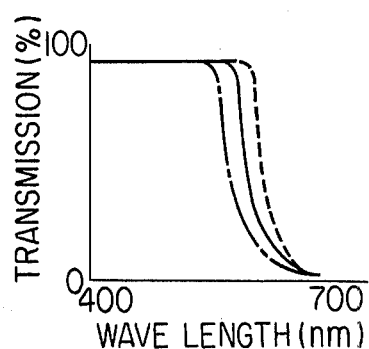
Figure 3A:
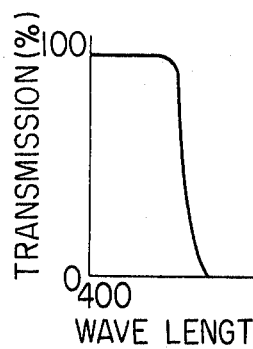
FIGS. 3A, 3B and 3C are graphs illustrating the light transmitting characteristics of the trimming filters.
Figure 3B:
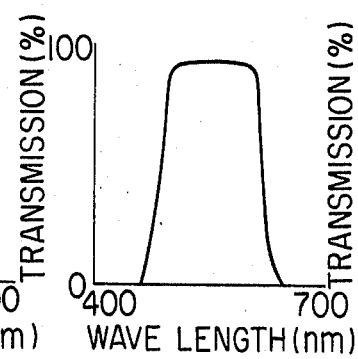
Figure 3C:
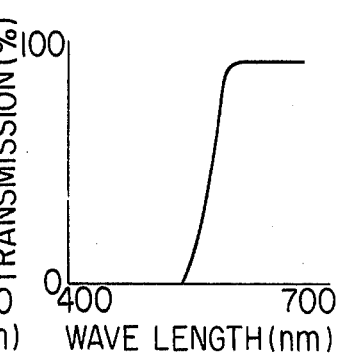
Figure 4A:
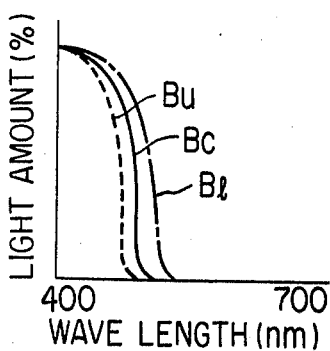
FIGS. 4A, 4B and 4C graphically illustrate the spectral distributions of the light beam passed from the object to the light receiving surfaces of the blue, green and red channel image pick-up tubes, respectively.
Figure 4B:
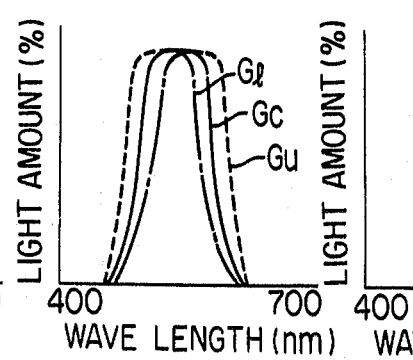
Figure 4C:
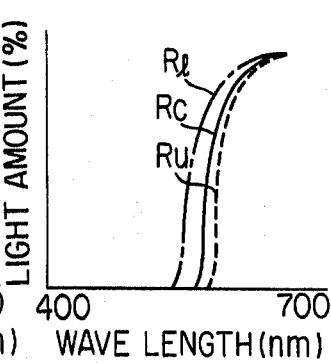
Figure 8:
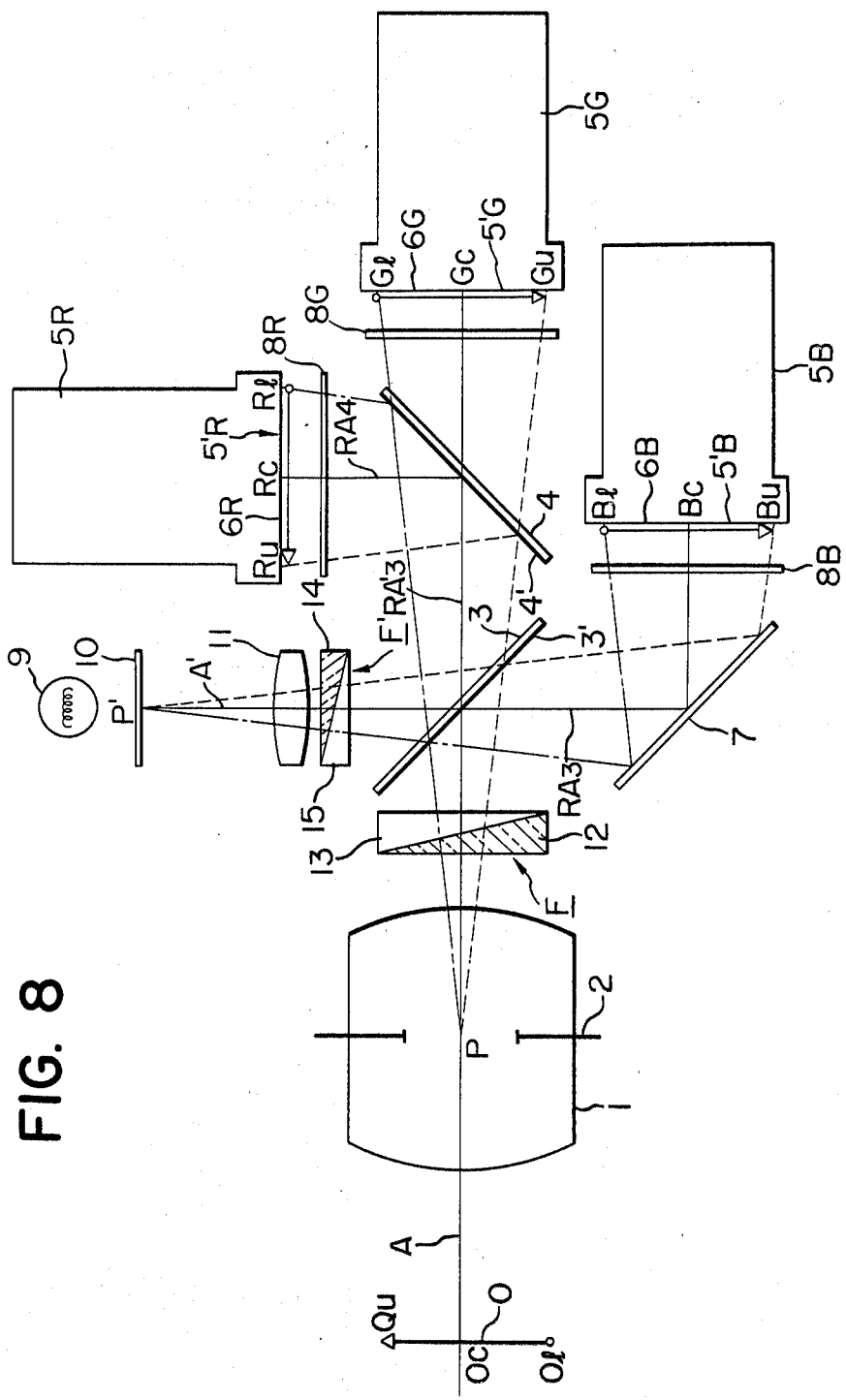
FIG. 8 is a schematic illustration of an embodiment of the present invention.
Figure 9A:
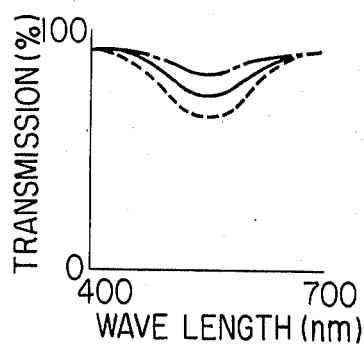
FIGS. 9A, 9B, 9C and 9D are graphs illustrating the light transmitting characteristics of color filters used with the embodiment of the present invention.

Referring to FIG. 8, there is illustrated an embodiment of the present invention which is an improvement over the apparatus of the prior art shown in FIG. 1. In FIG. 8, those members functionally similar to those in FIG. 1 are given similar reference characters used in FIG. 1. In the embodiment of FIG. 8, a color filter F whose transmission factor for a predetermined wavelength range of light continuously varies from one end thereof to the other is disposed in the path of the light beam from the object between the objective lens 1 and the dichroic mirror 3. This color filter F may be, for example, a filter capable of partly absorbing the light chiefly of the green wavelength range as illustrated in FIG. 9A, wherein the ordinate represents the transmission factor and the abscissa represents the wavelength. Such color filter F capable of partly absorbing the light chiefly of the green wavelength range has a characteristic as indicated by the broken line curve in FIG. 9A for the light travelling from the point P to the points $B_u$, $G_u$ and $R_u$, a characteristic as indicated by the solid line curve for the light travelling from the point P to the points $B_c$, $G_c$ and $R_c$, and a characteristic as indicated by the chain line curve for the light travelling from the point P to the points $B_l$, $G_l$ and $R_l$.

For the component member of the filter having the above-described characteristics, one embodiment of the present invention uses a wedge-shaped color glass filter 12 formed of a glass material which partly absorbs the green light in the main as shown in FIG. 8. This wedge-shaped color glass filter 12 is disposed at the aforementioned position in such a manner that the direction in which the thickness of the wedge varies, lies in plane containing the optical axis A of the objective lens 1 and the reflection optical axes $RA_3$ and $RA_4$ provided as the result of the optical axis A being bent by the first and second dichroic mirrors 3 and 4; and, that the direction in which the thickness of the wedge may be, increased, is optically coincident with the direction from the point $G_l$ toward the point $G_u$ on the light receiving surface $5_G'$ of the green channel image pick-up tube. In other words, the filter 12 which chiefly absorbs the green light is disposed so that the direction in which the absorption factor for the green light increases, optically corresponds to the direction in which the relative quantity of the green light separated by the first and second dichroic mirrors 3 and 4 is increased. If the wedge-shaped color glass filter 12 is only singly disposed, the light beam will be dispersed by this filter 12. To avoid this, as shown in FIG. 8, the wedge-shaped filter 12 has joined thereto a glass filter 13 which has a refractive index substantially equal to that of the wedge-shaped filter 12 and assumes a wedge shape whose thickness varies in the opposite direction to that of the filter 12, and which has no wavelength selecting characteristic, namely, which is colorless and transparent to light. The filter F thus forms a parallel-sided flat plate so that no color dispersion occurs therein.

Figure 9B:
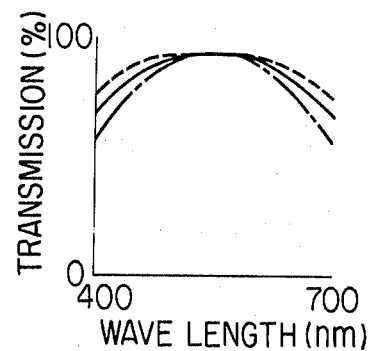

By arranging the color filter F in the manner described above, the quantities of the blue and red lights in the light beam passed from the object to the light receiving surfaces $5_B'$ and $5_R'$ of the blue and red channel image pick-up tubes are scarcely varied, but the quantity of the green light impinging on the light receiving surface $5_G'$ of the green channel pick-up tube is affected. More specifically, the color filter F absorbs the green light travelling toward the point $G_u$ at a greater percentage than the green light travelling toward the point $G_l$. Thus, the relative quantity of light on the light receiving surface $5_G'$ assumes the tendency as indicated by the broken line in FIG. 5B and such tendency becomes the same as that on the light receiving surfaces $5_B'$ or $5_R'$. Therefore, the color shading attributable to the light beam from the object is eliminated. (In this case, the absolute quantity of light impinging on the light receiving surface $5_G'$ is decreased as compared with the case where the filter 12 is absent, but this may be corrected by applying the electrical signal from the image pick-up tube $5_G$ to well-known correction means to increase the level by a predetermined amount.) In FIG. 8, the color filter F disposed in the light path between the objective lens 1 and the first dichroic mirror 3 may alternatively be a filter which partly absorbs the light chiefly of the blue range and the light chiefly of the red range, as illustrated in FIG. 9B. In this case, the spectrl transmitting characteristics as indicated by the broken line, the solid line, and the chain line, in FIG. 9B, are imparted to this filter F with respect to the light travelling from the point P to the points $B_u$, $G_u$ and $R_u$, the light travelling from the point P to the points $B_c$, $G_c$ and $R_c$ and the light travelling from the point P to the points $B_l$, $G_l$ and $R_l$. A specific example of the member constituting such filter F may be a filter formed of a glass material partly absorbing the lights chiefly of the blue and red ranges, and cut into a wedge shape. However, such wedge-shaped color glass filter is arranged in the attitude of the wedge 13 shown in FIG. 8, namely, in such a manner that the light indicated by the chain line passes through the thicker portion of the wedge more than the light indicated by the broken line. Accordingly, in this case, the wedge 12 in FIG. 8 provides a wedge-shaped glass having no spectral transmitting characteristic.

Figure 5A:
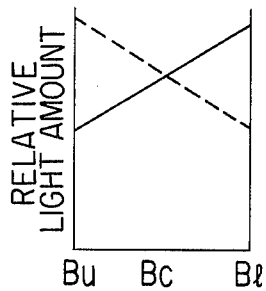
FIGS. 5A, 5B and 5C graphically illustrate the distributions of the relative light quantity regarding the light beam passed from the object to the light receiving surfaces of the blue, green and red channel image pick-up tubes.
Figure 5B:
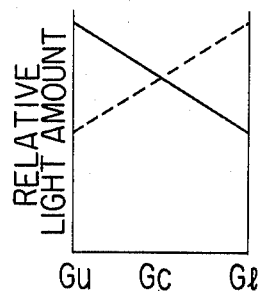
Figure 5C:
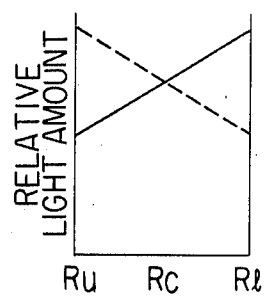
Figure 6A:
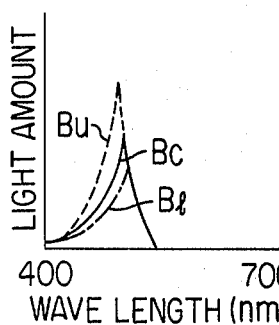
FIGS. 6A, 6B and 6C are graphs illustrating the spectral distributions of the light beam passed from the bias light source to the light receiving surfaces of the blue, green and red channel image pick-up tubes.
Figure 6B:
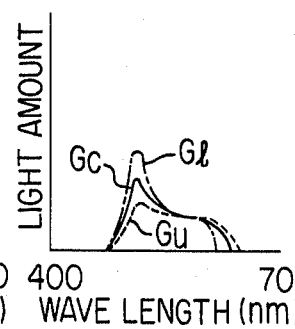
Figure 6C:
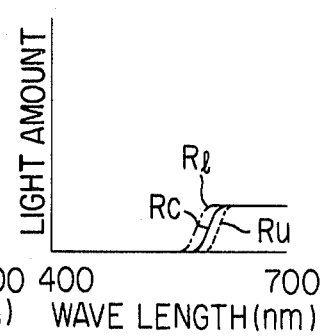

Thus, because of the above-described construction, the green light beam passed from the object to the light receiving surface $5_G'$ of the green channel image pick-up tube is scarcely affected, but the blue and red light beams passed from the object to the light receiving surfaces $5_B'$ and $5_R'$ of the blue and red channel image pick-up tubes assume the tendencies of the distribution of relative quantity of light as indicated by the broken lines in FIGS. 5A and 5C, respectively. Thus, the color shading attributable to the light beam from the object may be eliminated.

Figure 9C:
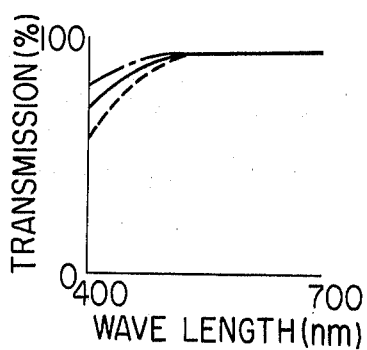

The foregoing description has been made of an embodiment which eliminates the color shading attributable to the light beam from the object O. However, in the image pick-up device provided with a bias illuminating means or a pattern projecting means as described previously, there occurs the color shading attributable to the bias light or the pattern projecting light beam. To prevent this, in the embodiment of FIG. 8, a color filter F' whose transmission factor for a predetermined wavelength range of light continuously varies from one end thereof to the other is disposed in the path of the bias light (or the pattern projecting light beam) between the condenser lens (or projecting lens) 11 and the color separating surface 3' of the first dichroic mirror 3. In the embodiment of FIG. 8, a wedge-shaped color class filter 14 is employed as a member for constituting such color filter F' and it is disposed in such a manner that the direction in which the thickness of the wedge varies, lies in a plane containing the optical axis A' of the condenser lens (or projecting lens) 11 and the reflecting optical axis $RA_3'$ resulting from bending of the optical axis A' by the first dichroic mirror 3. The wedge-shaped glass filter 14 may be, for example, a glass filter having the characteristic of partly absorbing the light chiefly of the blue wavelength range, as illustrated in FIG. 9C. In this case, as shown, the wedge-shaped filter 14 is arranged in such a manner that the light travelling from the center P' of the pupil of the condenser lens 11 to the point $B_u$ passes through the thicker portion of the wedge while the light travelling from the point P' to the point $B_l$ passes through the thinner portion of the wedge. In other words, the filter 14 which absorbs chiefly the blue light is arranged so that the direction in which the absorption factor for the blue light increases optically corresponds to the direction in which the relative quantity of blue light separated by the first dichroic mirror 3 increases. To avoid the dispersion attributable to the wedge-shaped color glass filter 14, a colorless, transparent, wedge-shaped glass 15 having substantially the same refractive index as that of the filter 14 but having no wavelength selecting characteristic may be joined to the filter 14 so as to form a generally parallel-sided flat plate, as already described.

The filter F' using the above-described color glass filter 14 absorbs the blue light travelling from the point P' to the point $B_u$ at a greater proportion than the blue light travelling from the point P' to the point $B_l$. Thus, the distribution of the relative quantity of light regarding the blue bias light on the light receiving surface $5_B'$ comes to have such a tendency as indicated by the broken line in FIG. 7A, while the distribution of the relative quantity of light regarding the bias light on the other channel light receiving surfaces $5_G'$ and $5_R'$ keeps the tendencies as indicated by the solid lines in FIGS. 7B and 7C. Thus, the color shading attributable to the bias light (or the pattern projecting light beam) is prevented from taking place.

Figure 9D:
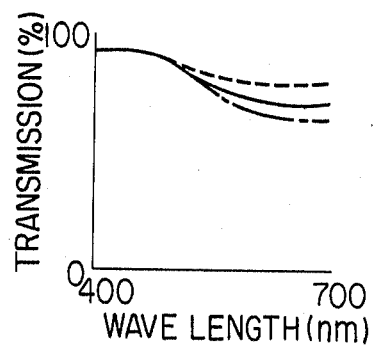

The color filter F' may alternatively be a filter having such a characteristic as illustrated in FIG. 9D, wherein the transmission factor for the green and red lights is lower for the light travelling from the point P' to the points $G_l$ and $R_l$ than for the light travelling from the point P' to the points $G_u$ and $R_u$. Again in this case, a filter formed by cutting a color glass material into a wedge shape may be utilized as a constituent member. Such wedge-shaped filter is disposed so that the direction in which its thickness increases is coincident with the wedge-shaped glass 15 of FIG. 8, and thus, the wedge-shaped glass having no wavelength selecting characteristics and joined thereto assumes an attitude similar to that of the wedge 14 of FIG. 8. Thus, the distribution of the relative quantity of the green and red bias lights (or pattern projecting light beam) travelling from the point P' to the light receiving surfaces $5_G'$ and $5_R'$ comes to assume the tendencies as indicated by the broken lines in FIGS. 7B and 7C. Accordingly, occurrence of the color shading attributable to the bias light may be prevented.

Figure 7A:
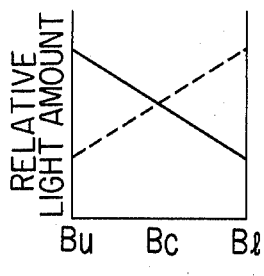
FIGS. 7A, 7B and 7C are graphs illustrating the distributions of the light quantity of the beam passed from the bias light source to the light receiving surfaces of the blue, green and red channel image pick-up tubes.
Figure 7B:
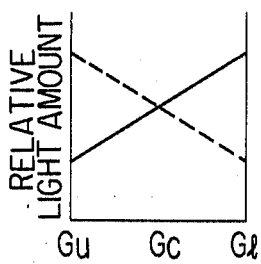
Figure 7C:
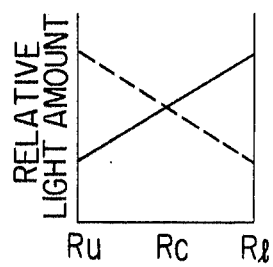

In the foregoing, description has been made individually of the elimination of the color shading attributable to the light beam from the object and the elimination of the color shading attributable to the bias light (or the pattern projecting light beam). However, in order to eliminate these two kinds of color shading simultaneously, the color filters F and F' may be disposed between the objective lens 1 and the first dichroic mirror 3 and between the condenser lens (or projecting lens) 11 and the first dichroic mirror 3. In this case, attention must be paid to the choice of the spectral characteristics of the color filters F and F' in order that the tendency of the distribution of the relative quantity of light regarding the light beam passed from the object to the light receiving surface of each channel image pick-up tube may be coincident with that of the bias light. More specifically, if the wedge-shaped color glass filter having the characteristic as shown in FIG. 9A is chosen as the wedge 12, the wedge-shaped color glass filter having the characteristic as shown in FIG. 9C is to be chosen as the wedge 14, whereby the inclinations of the distributions of the relative quantity of light indicated in FIGS. 7A, 7B and 7C are all upwardly directed to the right. (In this case, the wedges 13 and 15 are the glass having no wavelength selecting characteristic.) Alternatively, if the wedge-shaped color glass filter having the characteristic as shown in FIG. 9B is chosen as the wedge 13, the wedge-shaped color glass filter having the characteristic as shown in FIG. 9D chosen as the wedge 15, whereby the inclinations of the distributions of the relative quantity indicated in FIGS. 5A, 5B, 5C and FIGS. 7A, 7B, 7C are all downwardly directed to the right. (In this latter case, the wedges 12 and 14 are the glass having no wavelength selecting characteristic.)

In FIG. 8, the pupils of the objective lens 1 and the condenser lens 11 are positioned more closely to the respective lenses than to the light receiving surfaces $5_B'$, $5_B'$ and $5_R'$ of the image pick-up tubes. If the exit pupil of the objective lens 1 is situated rearwardly of the light receiving surfaces $5_B'$, $5_G'$ and $5_R'$, the direction in which the transmission factor of the color filter F varies should be opposite to the direction previously described. For example, the wedge-shaped color filter having the characteristic as shown in FIG. 9A should be disposed as is the wedge 13. The reason for this is that if the exit pupil of the objective lens 1 lies behind the light receiving surfaces of the image pick-up tubes, the relations in magnitude between the angles of incidence at which the principal rays impinging on the points $B_l$, $G_l$, $R_l$, $B_u$, $G_u$ and $R_u$ on the respective light receiving surfaces are incident on the color separating surfaces 3' and 4' of the first and second dichroic mirrors will be reverse from the relationship described in connection with FIG. 1, so that the inclinations of the solid lines in FIGS. 5A, 5B and 5C will all be reversed. If the pupil of the condenser lens (or projecting lens) 11 lies rearwardly of the light receiving surfaces $5_B'$, $5_G'$ and $5_R'$ of the respective image pick-up tubes, the direction in which the transmission factor of the color filter F' varies should be made opposite to the aforementioned direction, as already noted.

Where there is no necessity for the bias illumination or the pattern projection, or where the color shading attributable to the bias illumination or the pattern projection is negligible, or where the bias light directly impinges on the light receiving surfaces $5_B'$, $5_G'$ and $5_R'$ without causing it to pass through the color separating optical system, the location at which the filter F is disposed for preventing the color shading is disposed is not restricted to that shown in FIG. 8. For example, if the filter F is the filter having the characteristic as shown in FIG. 9A, this filter may be disposed in the light path between the first and the second dichroic mirrors 3 and 4 or in the light path between the second dichroic mirror 4 and the green channel image pick-up tube $5_G$. On the other hand, where it is sufficient, in the apparatus of FIG. 8, only to correct the differences in tendency of the relative light quantity of the bias light or the reference pattern projecting light beam between the light receiving surfaces of the respective channel image pick-up tubes, the color filter F' alone will suffice.

As is apparent from FIGS. 5A, 5B, 5C amd FIGS. 7A, 7B, 7C, the quantity of incident light on the light receiving surface of each image pick-up tube will increase or decrease from one end side thereof to the other even when an object emitting a uniform intensity of white light from the entire surface thereof is photographed. Thus, even if the color shading is eliminated, the brightness of the image on the display surface of the television receiver will differ between the opposite ends thereof. This is what is called the luminance shading. In practice, this luminance shading is neglected and not corrected, although it may also be eliminated in the embodiment of FIG. 8. In order to eliminate the luminance shading attributable to the light beam from the object, a wedge-shaped ND (neutral density) filter having no wavelength selecting characteristic, but varying only the quantity of transmitted light, may be joined to a wedge-shaped color glass filter to thereby form a parallel-sided flat color F,F'. If the wedge 12 is regarded as the wedge-shaped color glass filter having the characteristic as shown in FIG. 9A, it is true with the entire wavelength range that the more light travelling from the point P to the points $B_l$, $G_l$ and $R_l$ is absorbed by the wedge-shaped ND filter 13, than the light travelling from the point P to the points $B_u$, $G_u$ and $R_u$. This causes the distribution of the relative quantity of light on the light receiving surface of each channel image pick-up tube is substantially horizontal without being inclined as shown in FIGS. 5A, 5B and 5C, and thus, the luminance shading attributable to the light from the object may be eliminated. Likewise, to eliminate the luminance shading attributable to the bias light or the reference pattern projecting light beam, the wedge-shaped glass 15 joined to the wedge-shaped color filter 14 may be a wedge-shaped ND filter.

Figure 10:
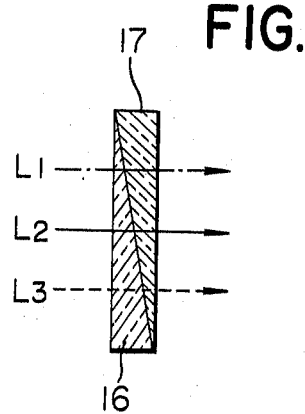
FIG. 10 illustrates a color filter used with the embodiment of the present invention.
Figure 11A:
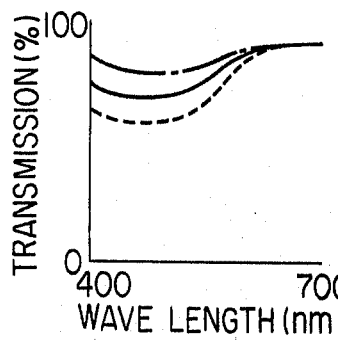
FIGS. 11A, 11B and 11C and FIGS. 12A, 12B and 12C are graphs illustrating the light transmitting characteristics of the color filter shown in FIG. 10.
Figure 11B:
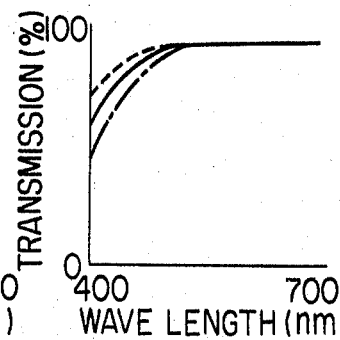
Figure 11C:
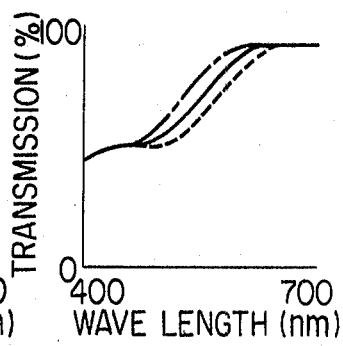
Figure 12A:
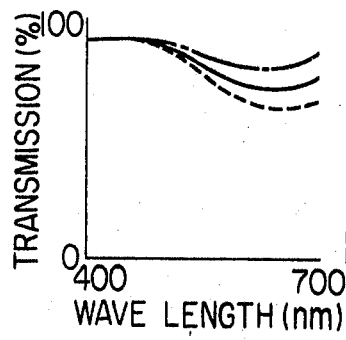
Figure 12B:
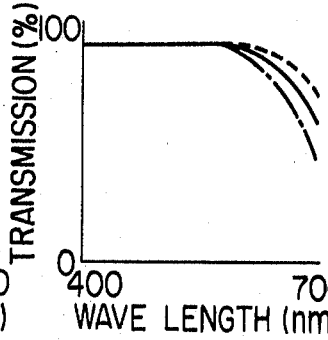
Figure 12C:
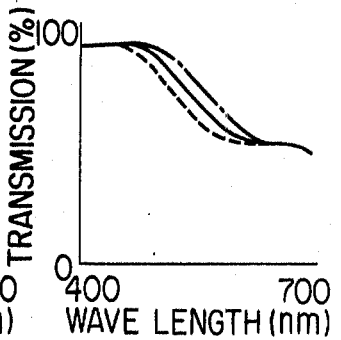

A further form of the color filter usable with the present invention is shown in FIG. 10. The color filter shown in FIG. 10 comprises wedge-shaped color glass filters 16 and 17 joined together to form a parallel-sided flat plate, the two color glass filters 16 and 17 being substantially equal in refractive index and capable of partly absorbing the lights chiefly of different wavelength ranges. The wedge-shaped color glass filters 16 and 17 so chosen may have the spectral transmitting characteristics as shown in FIGS. 11A and 11B. The filter formed by two filters joined together is such that, as shown in FIG. 11C, only the transmission factor for substantially green light continuously varies from one end thereof to the other. Alternatively, the wedge-shaped color glass filters 16 and 17 so chosen may have the spectral transmitting characteristics as shown in FIGS. 12A and 12B. The characteristic of the filter formed by joining together these two filters is as shown in FIG. 12C, wherein the transmission factor chiefly for green light alone varies as in the above-described filter. (In FIGS. 11A, 11B, 11C and FIGS. 12A, 12B, 12C, the chain line curves, the solid line curves and the broken line curves respectively indicate the spectral transmitting characteristics for the rays $L_1$, $L_2$ and $L_3$ in FIG. 10.) Where the filter of FIG. 10 having the characteristics as shown in FIGS. 11C and 12C is used in the embodiment of FIG. 8, such filter should be disposed at the position occupied by the wedges 12 and 13, in such a manner that the rays $L_1$, $L_2$ and $L_3$ in FIG. 10 respectively correspond to the rays indicated by the chain line, the solid line and the broken line in FIG. 8. By doing so, the tendency of distribution of the relative light quantity of the light beam passed from the object to the light receiving surface $5_G'$ of the green channel image pick-up tube may be corrected to that indicated by the broken line in FIG. 5B.

Figure 13:
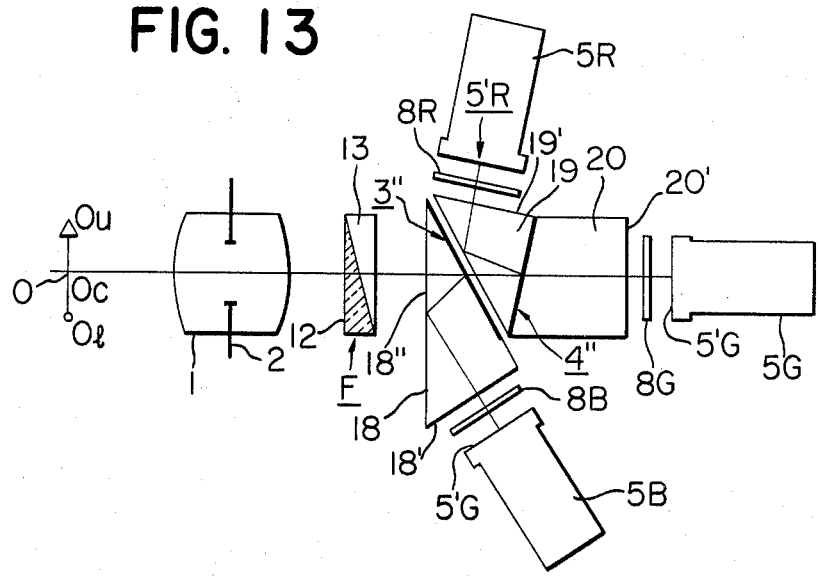
FIG. 13 is a schematic illustration of another embodiment of the present invention.

FIG. 13 shows still another embodiment of the present invention, wherein the members functionally similar to those in the apparatus of FIGS. 1 and 8 are given similar reference characters. In this embodiment, a prism is used in place of the dichroic mirrors as the color separating optical system. More specifically, reference numerals 18, 19 and 20 respectively designate first, second and third prism element and the first and the second elements 18 and 19 are juxtaposed with a slight air gap intervening therebetween, while the second and the third elements 19 and 20 are joined together. The surface of the first element 18 which is opposed to the second element 19 has evaporated thereon a dichroic film which is capable of reflecting almost all of the blue light and transmitting the lights of the other wavelength ranges, and the interface between the second and the third elements 19 and 20 has evaporated thereon a dichroic film which is capable of reflecting almost all of the red light and transmitting the lights of the other wavelength ranges, whereby there are formed first and second color separating surfaces 3'' and 4''. The reflecting optical axes of the first and second color separating surfaces lie on a common plane, and at different sides with respect to the optical axis of the objective lens 1. The first prism element 18 functions to totally reflect the blue light beam reflected by the first color separating surface 3'' so as to cause it to pass through the exit pupil 18' to the light receiving surface $5_B'$ of the blue channel image pick-up tube; the second prism element 19 funcctions to totally reflect the red light beam reflected by the second color separating surface 4'' so as to cause it to pass through the exit pupil 19' to the light receiving surface of the red channel image pick-up tube; and the third prism element 20 serves to substantially equalize the length of the path of the green light beam to that of the blue and the red channel and pass the green light beam through the exit pupil 20' to the light receiving surface of the green channel image pick-up tube.

In a camera using a color separating optical system employing such a prism, the distribution of the relative quantity of light on the light receiving surfaces of the respective channel image pick-up tube exhibits the tendencies as indicated by the solid lines in FIGS. 5A, 5B and 5C, thus causing occurrence of color shading. However, as shown in FIG. 13, the color shading may be eliminated by disposing, in the light path between the objective lens 1 and the incidence surface 18″ of the first prism element 18, a color filter F whose transmission factor for predetermined wavelength ranges of light (green or blue and red) continuously varies from one side thereof to the other. This color filter F may be constituted by one of two wedge-shaped color glass filters of any of the above-described various types, and the wedge 12 in FIG. 13 is a wedge-shaped color glass filter having the characteristic as indicated in FIG. 9A, while the wedge 13 is a wedge-shaped glass having no wavelength selecting characteristic. If the wedge 13 is formed as an ND filter, the luminance shading may also be corrected.

Figure 14:
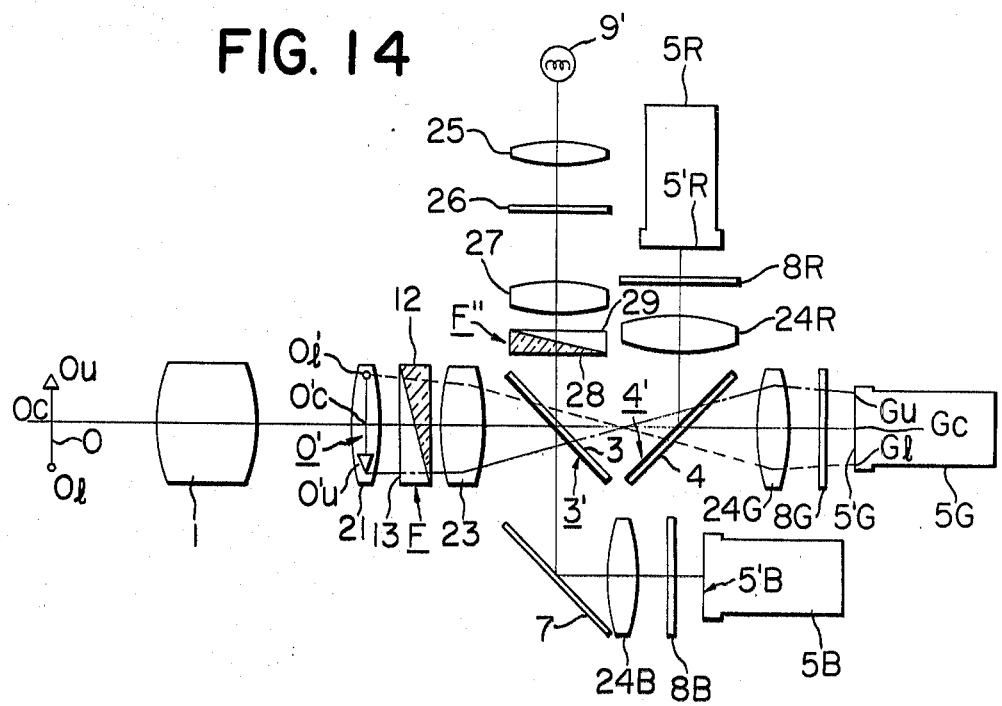
FIG. 14 is a schematic illustration of still another embodiment of the present invention.

FIG. 14 is a schematic illustration of a further embodiment of the prresent invention. In this Figure, the members functionally similar to those in FIGS. 1 and 8 are given similar reference characters.

In this embodiment, the objective lens 1 is arranged to focus the image of the object O upon a field lens 21, and such image may in turn be formed on the light receiving surface of each channel image pick-up tube by a relay lens system. The relay lens system includes a first relay lens 23 and second relay lenses $24_B$, $24_G$ and $24_R$ for blue, green and red channels, respectively. In this Figure, also the pupil of each system lies at an intermediate portion between the first and the second relay lens, as is usual with such an image formation system. The first and second dichroic mirrors 3 and 4 are disposed between the first and second relay lenses 23 and $24_G$, and obliquely with respect to the optical axis, as shown. Thus, blue green and red erecting images of the object O may be formed on the light receiving surfaces $5_B'$, $5_G'$ and $5_R'$ of the respective image pick-up tubes.

Now, in reference to the apparatus of FIG. 14, description will be made of the path followed by the principal rays of the light impinging on the light receiving surface $5_G'$ of the green channel image pick-up $5_G$. Assume that $B_c$, $G_c$ and $R_c$ are respectively the centers of the light receiving surfaces $5_B'$ $5_G'$ and $5_R'$ of the image pick-up tubes $5_B$, $5_G$ and $5_R$, $B_u$, $G_u$ and $R_u$ are respectively the points at which the upper point $O_u$ of the object, as viewed in the plane of the drawing sheet focused is on the respective light receiving surfaces; and $B_l$, $G_l$ and $R_l$ are respectively the points, at which the lower point $O_l$ of the object is focused on the respective light receiving surfaces. The principal ray (broken line) from the inverted image $O_l'$ of the point $O_l$ of the object formed on the field lens 21 passes through the upper part of the first relay lens, as viewed in the plane of the drawing sheet, and through the lower part of the second relay lens $24_G$, to reach the point $G_u$ on the light receiving surface $5_G'$, while the principal ray (chain line) from the image $O_u'$ of the point $O_u$ of the object passes through the lower part of the first relay lens 23, and therefore the upper part of the second relay lens $24_G$, to reach the point $G_l$ on the light receiving surface $5_G'$.

As will be apparent from the drawing, the angle at which the principal ray indicated by the broken line is incident on the first dichroic mirror 3 is greater than that of the principal ray indicated by the chain line on the other band, the angle at which the principal ray indicated by the broken line is incident on the second dichroic mirror 4 is smaller than that of principal ray indicated by the chain line. From what has been previously described, it will thus be seen that the distribution of the relative quantity of light on the light receiving surface $5_G'$ has the tendency as represented by the broken line in FIG. 5B. It will likewise be seen that the distribution of the relative quantity of light on the light receiving surfaces $5_B'$ and $5_R'$ has the tendencies as represented by the broken lines in FIGS. 5A and 5C.

In FIG. 14, the color filter F comprising a wedge-shaped color glass filter 12 having the characteristic as shown in FIG. 9A, and a wedge-shaped glass 13 having no wavelength selecting characteristic and joined thereto is disposed between the field lens 21 and the first relay lens 23. In FIG. 14, the orientation of the wedge-shaped color glass filter 12, as viewed on the plane of the drawing sheet, differs from that of the wedge-shaped color glass filter 12 of FIGS. 8 and 13 having the characteristic as shown in FIG. 9A. This difference is apparent from the paths of the above-described principal rays. In either case, however, the principal ray, indicated by the broken line, passes through the thicker portion of the wedge-shaped color glass filter which absorbs the green light at a greater percentage than the principal ray indicated by the chain line. Generally, a filter whose transmission factor for a predetermined wavelength range varies from one end thereof to the other, is so disposed that the direction in which the transmission factor for the predetermined wavelength range of light decreases, optically corresponds to the direction in which the relative light quuantity, in the predetermined wavelength range, increases.

of course, in FIG. 14, a filter having the characteristic as shown in FIG. 9B, 9C or 12C may also be used as the filter F. In any case, the color filter is disposed in such a manner that the characteristics indicated by the broken line and the chain lines in each characteristic graph may apply to the principal rays indicated by the broken and the chain line in FIG. 14.

The apparatus of FIG. 14 is equipped with a reference pattern projecting optical system. This optical system is provided with a light source 9', a condenser lens 25 and a member 26 marked with a reference pattern. Designated by 27 is a lens which, like the first relay lens 23, cooperates with the second relay lenses $24_B$, $24_G$ and $24_R$ to constitute the image formation systems. Each of these image formation systems forms the image of the reference pattern on the light receiving surfaces $5_B'$, $5_G'$, $5_R'$ of the respective channel image pick-up tubes.

On the light receiving surfaces $5_B'$, $5_G'$ and $5_R'$, the distribution of the relative quantity of light regarding the reference pattern projecting light beam formed by the optical system is as indicated by the broken lines in FIGS. 7A, 7B and 7C, hence there is an means occurrence of color shading. To avoid this, a color filter F″ similar to the color filter F′ of FIG. 8 may be disposed in the path of the reference pattern projecting light beam. In FIG. 14, the color filter F″ is shown to be disposed between the lens 27 and the first dichroic mirror 3. If this color filter F″ is constituted by a wedge-shaped color glass filter 28 having the characteristic as shown in FIG. 9C and a wedge-shaped glass 29 joined thereto and having no wavelength selecting characteristic, the distribution of the relative quantity of light regarding the blue reference pattern projecting light beam on the light receiving surface $5_B'$ of the blue channel image pick-up tube will be corrected to the trend as indicated by the solid line in FIG. 7A, thus eliminating the color shading attributable to the reference pattern projecting light beam. Again, in this case, the wedge-shaped color glass filter 28 having the characteristic as shown in FIG. 9C as viewed on the plane of the drawing sheet, is oriented opposite to that of the wedge-shaped color glass filter 14 of FIG. 8 having the characteristic as shown in FIG. 9C. This difference is attributable to the difference in path of the principal ray between these two filters, as already noted. Also, the color filter F″ may be one that has the characteristic as shown in FIG. 9D and, again in this case, the filter F″ must be so oriented that the direction in which its transmission factor for the green and red lights decreases, corresponds to the direction in which the relative light quantity on the light receiving surfaces $5_G'$ and $5_R'$ of the green and red channel image pick-up tubes increases. Further, if the member 26 is a diffusing plate, the above-described optical system will be a bias illuminating system. (Where the two color filters F and F″ are employed as in FIG. 14, the same attention as that mentioned previously must be paid to the choice of the wavelength selecting characteristics of these color filters F and F″.)

What is claimed is:

1. A color television camera comprising:
   a plurality of image pick-up devices each having a light receiving surface for receiving a light beam of a predetermined wavelength range and generating an electrical signal corresponding to the distribution of the light quantity of said light beam of the predetermined wavelength range impinging on said light receiving surface;
   a lens system optically aligned with an object and each of said plurality of image pick-up devices;
   a color separating optical system having at least one dichroic surface disposed in the light path between said lens system and said plurality of image pick-up devices and being inclined with respect to the optical axis of said lens system, said optical system including said dichroic surface being effective to separate the light beam from said object passed through said lens system into a plurality of light beams of predetermined wavelength ranges, and to cause said light beams to impinge on the light receiving surfaces of said plurality of image pick-up devices; and
   a color filter having a transmission factor, for the light of at least one said predetermined wavelength range, which continuously varies from one end side thereof to the other, said color filter being disposed in the light path between said lens system and the dichroic surface of said color separating optical system, so that the direction in which its transmission factor for the light of said one predetermined wavelength range varies, corresponds to the direction of variation of the relative light quantity of the light beam of said one predetermined wavelength range.

2. A color television camera according to claim 1, wherein said plurality of image pick-up devices comprises at least one said device for receiving the blue light beam, one for receiving the green light beam, and one for receiving the red light beam; said color separating optical system is provided at the rear side of said lens system with a first dichroic surface for reflecting the blue light and a second dichroic surface for reflecting the red light; and said color filter is disposed in the light path between said lens system and one of said first and second dichroic surfaces.

3. A color television camera according to claim 2, wherein said first and second dichroic surfaces are disposed in the named order along the light path from said lens system; and said color filter partly absorbs primarily the blue and red lights and is disposed in the light path between said lens system and said first dichroic surface.

4. A color television camera according to claim 2, wherein said first and second dichroic surfaces are disposed in the named order along the light path from said lens system; and said color filter partly absorbs primarily the green light and is disposed in the light path between said lens system and said second dichroic surface.

5. A color television camera according to claim 1, wherein said color filter comprises a wedge-shaped color glass member and a wedge-shaped colorless glass member having the same refractive index as that of said color glass member, said glass members being joined together to form a generally parallel-sided flat plate.

6. A color television camera according to claim 5, wherein said wedge-shaped colorless glass member is a wedge-shaped neutral density filter.

7. A color television camera according to claim 1, wherein said color filter comprises two wedge-shaped color glass members having the same refractive index but mutually different colors, said two members being joined together to form a generally parallel-sided flat plate.

8. A color television camera comprising:
   a first image pick-up device for receiving a light beam of a first predetermined wavelength range;
   a second image pick-up device for receiving a light beam of a second predetermined wavelength range different from said first predetermined wavelength range;
   a first lens system optically aligned with a first object and with said first and second image pick-up devices;
   a second lens system optically aligned with a second object and with said first and second image pick-up devices, said second lens system being disposed with its optical axis intersecting the optical axis of said first lens system;
   a color separating optical system having a dichroic surface for reflecting primarily one of said light beams of said first and second predetermined wavelength ranges and for transmitting primarily the other of said light beams, said dichroic surface being disposed at the intersection between the optical axes of said first and second lens systems to integrate said optical axes of said first and second lens systems;
   a first trimming filter disposed in the light path between said first image pick-up device and said dichroic surface, and having a transmitting characteristic for the light of said first predetermined wavelength range;
   a second trimming filter disposed in the light path between said second image pick-up device and said dichroic surface, and having a transmitting characteristic for said second predetermined wavelength range;
   a color filter having a transmission factor, for the light of said first wavelength range, which varies from one end side thereof to the other, said color filter being disposed in the light path between said first lens system and said dichroic surface in such a manner that the direction of variation of its transmission factor for the light of said first wavelength range corresponds to the direction of variation of the relative light quantity of the light beam of said first predetermined wavelength range to be separated by said color separating optical system.

9. A color television camera according to claim 8, wherein said color filter comprises a wedge-shaped color glass member and a wedge-shaped colorless glass member having the same refractive index as that of said color glass member, said members being joined together to form a generally parallel-sided flat plate.

10. A color television camera according to claim 9, wherein said wedge-shaped colorless glass member is a wedge-shaped neutral density filter.

11. A color television camera according to claim 8, wherein said color filter comprises two wedge-shaped color glass members having the same refractive index but mutually different colors, said two glass members being joined together to form a generally parallel-sided flat plate.

12. A color television camera according to claim 8, further comprising a second color filter disposed in the light path between said second lens system and said dichroic surface, said second color filter having a transmission factor, for the light of said second wavelength range, which varies from one end side thereof to the other, and being so disposed that the varying direction of its transmission factor corresponds to the direction of variation of the relative light quantity of the light beam of said second predetermined wavelength range to be separated by said color separating optical system.

13. A color television camera according to claim 12, wherein said second color filter comprises a wedge-shaped color glass member and a wedge-shaped colorless glass member having the same refractive index as that of said color glass member, said members being joined together to form a generally parallel-sided flat plate.

14. A color television camera according to claim 12, wherein said wedge-shaped colorless glass member is a wedge-shaped neutral density filter.

15. A color television camera according to claim 12, wherein said second color filter comprises two wedge-shaped color glass members having the same refractive index but mutually different colors, said two members being joined together to form a generally parallel-sided flat plate.

* * * * *

UNITED STATES PATENT OFFICE
CERTIFICATE OF CORRECTION

Patent No. 4,084,179  Dated April 11, 1978

Inventor(s) Takeshi Sekiguchi

It is certified that error appears in the above-identified patent and that said Letters Patent are hereby corrected as shown below:

| | |
|---|---|
| Column 1, line 48 | Change "First second" to --First and second--; |
| 3, line 17 | Before "Figs.", insert --In--; |
| 3, line 27 | Delete "of light"; |
| 4, line 14 | After "tubes", insert --of a type--; |
| 4, line 46 | Change "Fromthe" to --From the--; |
| 5, line 55 | Delete "the"; |
| 6, line 32 | Change "surface" to --surfaces--; |
| 7, line 55 | After "lies in", insert --a--; |
| 8, line 40 | Change "spectre" to --spectral--; |
| 10, line 39 | After "Fig. 9D", insert --is--; |
| 10, line 49 | Change "$5'_B$" to --$5'_G$--; |
| 11, line 43 | After "color", insert --filter--; |
| 12, line 35 | Change "element" to --elements--; |
| 12, line 57 | Change "funcctions" to --functions--; |

UNITED STATES PATENT OFFICE
CERTIFICATE OF CORRECTION

Patent No. 4,084,179  Dated April 11, 1978

Inventor(s) Takeshi Sekiguchi

It is certified that error appears in the above-identified patent and that said Letters Patent are hereby corrected as shown below:

Column 13,

| | |
|---|---|
| 14, line 33 | Change "of course" to --Of course--; |
| 14, line 55 | Delete "means". |

Signed and Sealed this

Fifth Day of December 1978

[SEAL]

Attest:

RUTH C. MASON
Attesting Officer

DONALD W. BANNER
Commissioner of Patents and Trademarks